J. SMITH.
MEANS FOR TEACHING DRAWING.
APPLICATION FILED MAR. 21, 1916.
1,280,094.
Patented Sept. 24, 1918.
2 SHEETS—SHEET 2.
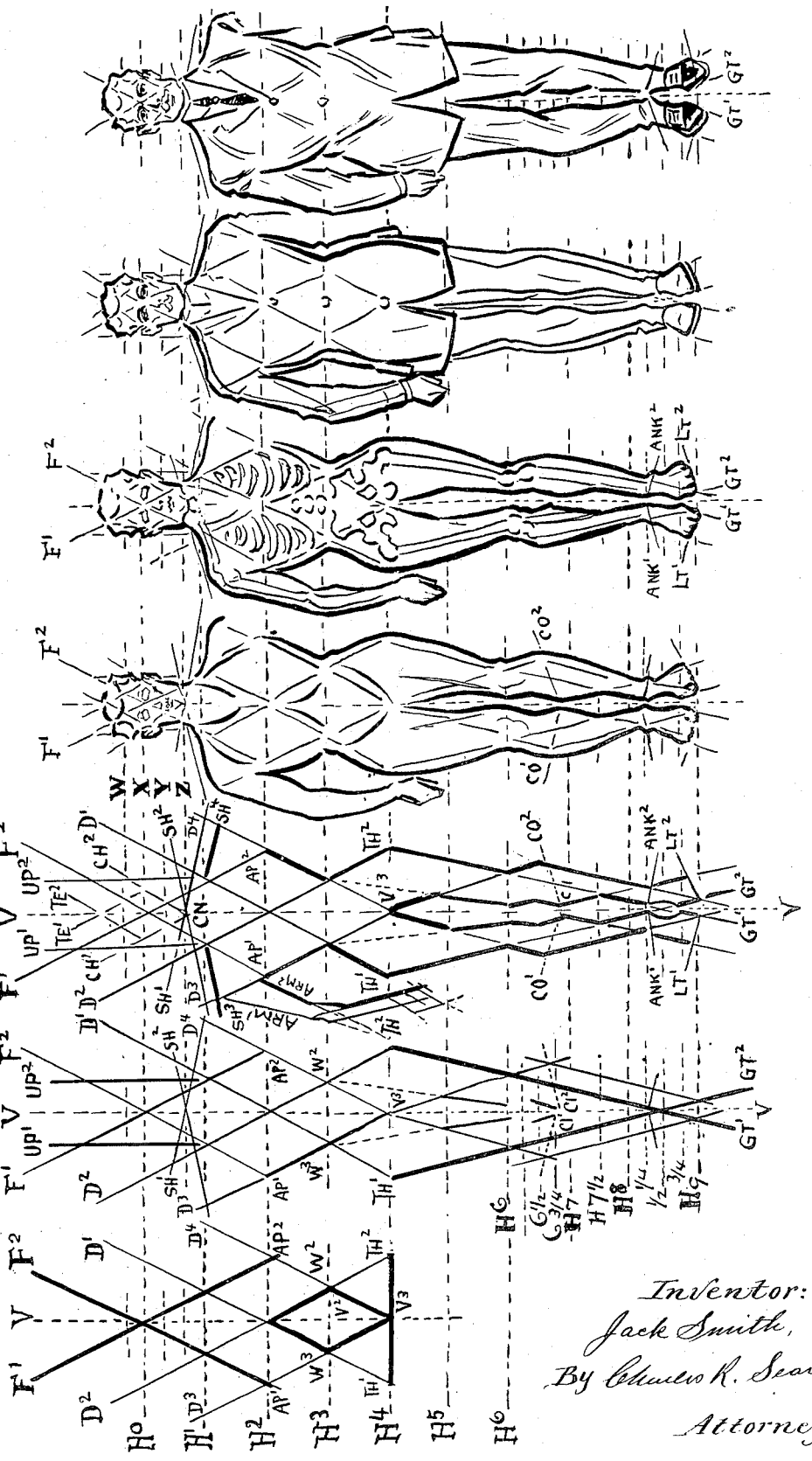

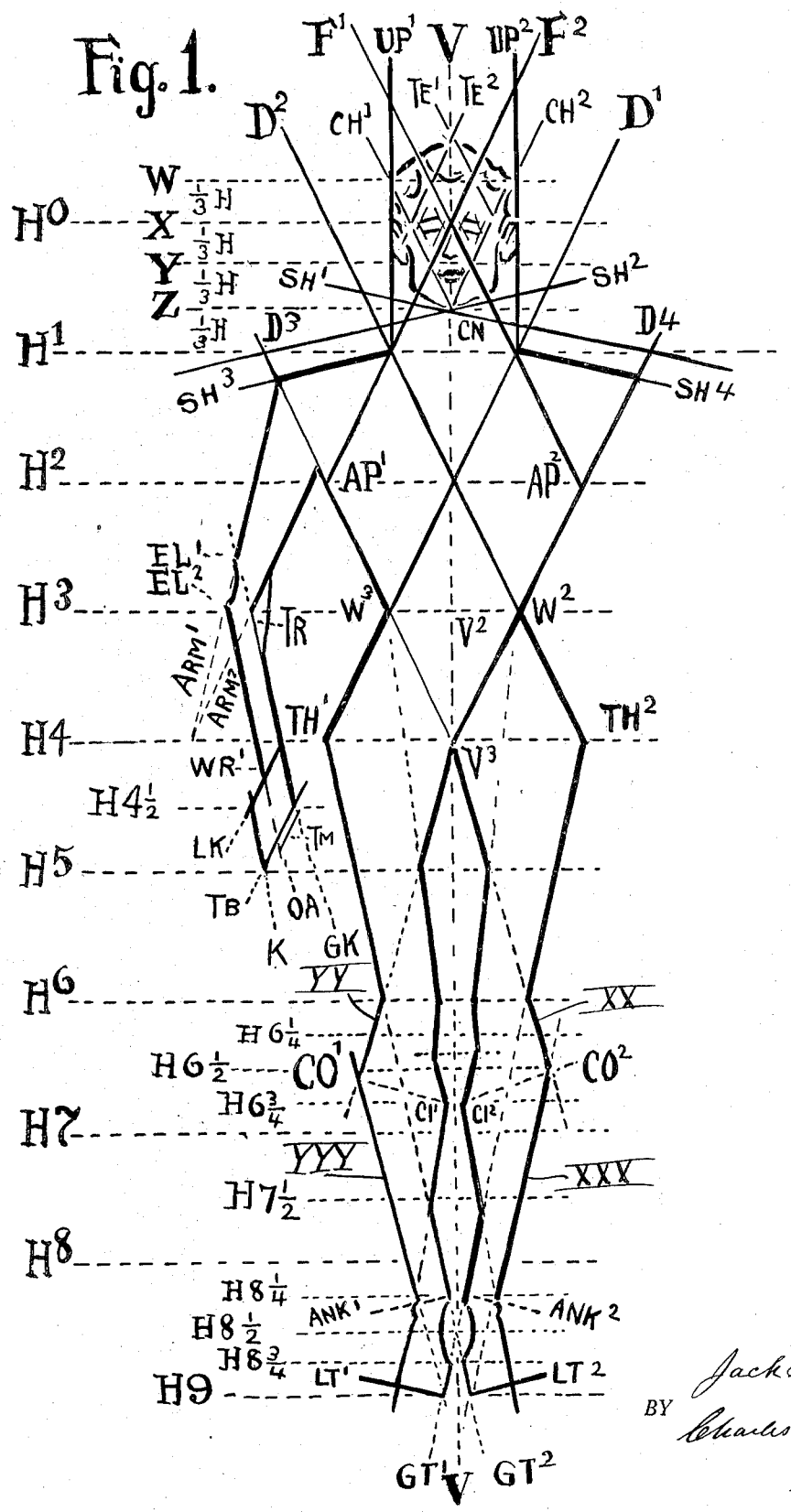

UNITED STATES PATENT OFFICE.

JACK SMITH, OF NEW YORK, N. Y.

MEANS FOR TEACHING DRAWING.

1,280,094. Specification of Letters Patent. Patented Sept. 24, 1918.

Application filed March 21, 1916. Serial No. 85,538.

*To all whom it may concern:*

Be it known that I, JACK SMITH, a citizen of the United States, residing in the city of New York, borough of Bronx, in the county of Bronx and State of New York, have invented a certain new and useful Improvement in Means for Teaching Drawing, of which the following is a specification.

The invention relates to means for teaching the drawing of the human figure, and the object of the invention is to provide means whereby the student may easily produce a correctly proportioned outline or skeletonized draft serving as a foundation upon which the desired draped or undraped figure may be completed as the artistic taste and ability of the student may determine.

The invention consists in certain arrangements of lines as illustrated in charts or sheets, by which the above objects are attained, to be hereinafter described and claimed.

The accompanying drawings form a part of this specification and show the invention as it has been carried out in practice.

Figure 1 is a face view of a sheet having lines arranged to aid in producing the figure, the latter being partially shown thereon.

Figs. 2, 3, 4, 5, 6, 7 and 8 are corresponding views on a smaller scale, showing the same male draped figure in successsive stages of development.

Similar letters of reference indicate the same parts in all the figures.

The invention is based on the discovery that the face or head length may be used as a foundation for the other measurments of a correctly proportioned human figure, and that a system of equal rhombs, or conventional lozenge or diamond figures, arranged with their acute angles vertical, may be constructed with such head-length as their bases in such manner as to locate correctly all the salient points required to depict the human figure.

Sheets or charts having such rhombs indicated thereon in faint lines may be employed in teaching by this system, or the rhombs may be drawn upon the sheet and afterward erased from the finished drawing. The width of each rhomb should be approximately one head-length, and the height should be twice the width to produce a correctly proportioned figure; variations from this rule will produce exaggerated figures which in extreme disproportion offer grotesque figures useful in comic cartoons and the like.

Referring to the drawings and particularly to Figs. 1, 2 and 3, V V is a vertical line which is to be the central vertical line of the figure to be drawn, the length of the head is then decided upon and laid off on the line V V to produce ten equally spaced points thereon through which are drawn ten horizontal lines marked $H^0$, $H^1$ to $H^9$. At the intersection of line $H^4$ with V V, at $V^3$, lay off one head-length on each side as at $TH^1$ and $TH^2$ and join these points by diagonal lines converging at the intersection of V V with $H^2$; these diagonals give the angular lines of the series of rhombs which are completed by drawing other diagonals parallel with such angular lines. When thus drawn it will be found that the upper angle of the central rhomb, lines $F^1$ $F^2$, converges at the intersection of the line V V and $H^0$ exactly between the eyes in the face of the figure and is for convenience named the "first head", and that the vertical lines $UP^1$ $UP^2$ drawn from the side angles of the same rhomb inclose and determine the width of the face. Also that the line $W^2$ $W^3$ on $H^3$ correctly indicates the waist-line, and $AP^1$ and $AP^2$ on $H^2$ locates the chest-width and armpits.

The face features are located from the intersection of $H^0$ with V V and the diagonals $F^1$ $F^2$. Draw the equidistant horizontal parallel lines W, X (coincident with $H^0$), Y, and Z each one-third head apart, with W above X, making three spaces WX, XY and YZ.

Upper shoulder lines $SH^1$ and $SH^2$ cut V V at Z and cut $H^1$ at $D^3$ and $D^4$ which latter points are at the intersection of the angular rhomb lines from $V^3$ with $H^1$. The lower shoulder lines $SH^3$ and $SH^4$ are parallel with the upper shoulder lines $SH^1$ $SH^2$ starting from the intersection of the $UP^1$ $UP^2$ on $H^1$.

The head rests between the shoulder lines $SH^1$ and $SH^2$, the intersection of the latter at CN locates the chin. The ears must lie inside the $UP^1$ and $UP^2$ and between X and Y. Jaw lines drop vertically from the inside of the ears to about $F^1$ $F^2$. The cheek lines $CH^1$ and $CH^2$ start at CN (chin) and are parallel respectively with $F^1$ and $F^2$. The temple lines $TE^1$ and $TE^2$ are parallel respectively with $F^1$ and $F^2$ but begin on X ($H^0$) and the intersection of $CH^2$ and $CH^1$, meeting above on V V. These face lines $CH^1$ and $CH^2$ and $TE^1$ and $TE^2$ make four regular rhombs similar to but smaller than the rhombs as at $V^2$ upon which the figure is based. The eyes lie in the small diamonds at either side of $F^1$ $F^2$ crossing at X ($H^0$) or mostly below X. The eye space is an elongated hexagon, the end lines of which are parallel to the adjacent diagonals $TE^1$ $TE^2$ $CH^1$ $CH^2$ and $F^1$ $F^2$. The top and bottom lines of the eye spaces are parallel in each and incline slightly from X toward the ear. This makes the eyes conform to the skull-orbs. The eyes are about twice as wide as high. The nose lies in the triangle $F^1$ $F^2$ and Y, and the mouth about in the center of $CH^1$ $CH^2$ and Y.

The main outlines of the legs are directly related to the rhombs forming the trunk, and are found by producing lines from certain angles of the latter to points at fixed distances on the center line V V computed by rhomb or head-lengths, and for clearness of illustration the rhombs are omitted from the drawings on the lower portion of the figures.

The outer thigh lines are produced by drawing long diagonal lines from $TH^1$ and $TH^2$ to $GT^1$ and $GT^2$ crossing at the line $H^8$ ½ midway between $H^8$ and $H^9$ on the center line V V and ending at $H^9$; the outer portions of these diagonals cross $H^6$, at which points the outer thigh lines terminate.

The outer calf lines run from $V^3$ to $CO^1$ and $CO^2$ cutting $TH^1$ and $GT^2$ on $H^6$. Another line from the intersection of $H^9$ and $GT^1$ and $TH^2$ on each side of V V, and running nearly parallel with the lines $TH^1$ $GT^2$ and $TH^2$ $GT^1$ but diverging slightly therefrom, meets $CO^1$ and $CO^2$ at about $H^6$ ½. $CO^1$ and $CO^2$ are the salient outside-calf points.

The points $CO^1$ and $CO^2$ are determined from the lines $TH^1$ $GT^2$ and $TH^2$ $GT^1$ which cross at $H^8$ ½; other lines drawn from $V^3$ to the intersection of lines $TH^1$ $GT^2$ and $TH^2$ $GT^1$ on $H^6$ and continued to $H^6$ ½ locate the points $CO^1$ and $CO^2$.

From $CO^1$ and $CO^2$ lines shown as dotted, are drawn each at a right angle to its $V^3$ line, which intersect $TH^1$ $GT^2$ and $TH^2$, $GT^1$ and extend nearly to V V. Each of these dotted lines is intersected, as at $CI^1$ $CI^2$ by lines beginning below $H^9$, cutting $CO^1$ and $CO^2$ lines at $H^8$ ¼ and cutting $TH^1$, $GT^2$ and $TH^2$, $GT^1$ on $H^7$ ½. $CI^1$ and $CI^2$ are the salient inside-calf points.

The inner thigh lines are those portions of the $V^3$ and $CO^1$ and $CO^2$ lines ending at their intersection with $H^5$ and are continued by lines beginning at $H^6$ and converging from $W^3$ $W^2$ and ending at about $H^6$. Short lines for $CI^1$ $CI^2$, parallel with lines Y Y, and $CO^2$, extend from about $H^6$ ¾ to a little above $H^6$ ½ and are then continued nearly vertically to $H^6$ where they join the inside-leg lines.

From the intersection of $H^8$ ¼ and the diagonals $TH^1$, $GT^2$ and $TH^2$ $GT^1$, lines are drawn at a right angle to such diagonals and carried outwardly to cut Y Y Y and X X X; these intersections form the ankle lines, indicated by $ANK^1$ and $ANK^2$. From the inside ankle on each side a concave line joins $TH^2$, $GT^1$ and $TH^1$ $GT^2$ at $H^8$ ¾.

The toe lines $LT^1$ and $LT^2$ start at $GT^1$ and $GT^2$ on $H^9$ and extend each parallel with the opposite shoulder line $SH^4$ $SH^3$.

The arm, only the right arm is shown, is formed by a line $ARM^2$ parallel with the line $AP^1$, $F^2$, beginning slightly above $H^2$ and running to $H^4$, another (outer) line $ARM^1$ runs from $SH^3$ and intersects $ARM^2$ at $H^4$. Two parallel lines GK and OA also parallel with $TH^1$, $GT^2$, intersect $ARM^1$ and $ARM^2$ each on $H^3$, and GK is continued to cut $ARM^1$ at $EL^1$; the two angles $EL^1$ and $EL^2$ joined by a short concave line form the elbow. On the inner lines of the arm opposite $EL^2$ a short line about one-half a head long forms a triangle at TR with the arm lines $ARM^2$ and GK, and $H^3$ bisects the triangle, approximately.

The parallel lines GK and OA are cut by two or more lines LK and TB parallel with each other and with $D^1$ $TH^1$; LK begins at $H^4$ on GK and extends to about $H^4$ ½, TB begins at $H^4$ ½ on GK and extends to about $H^5$, and are joined by the line K. These lines form the outline of the hand. A short line TM parallel with TB shows the thumb.

Fig. 2 shows the method of laying off the diagonals to form the rhombs. Lay off the longitudinal parallels $H^0$ to $H^9$, one head (vertical measurement) apart on the center line V V; from the latter lay off one head-length on each side on $H^4$ to locate the points $TH^1$ and $TH^2$, draw from $TH^1$ through V V at $H^2$ and from $TH^2$ through V V at $H^2$. These diagonal lines produce the rhombs by drawing lines parallel with each from $V^3$ and the intersections of the H lines with the vertical V V. The rhombs thus proportioned locate by the above system the important points required in drawing a properly proportioned figure. By lessening the width of the rhombs and retaining the height, a well-proportioned but slim figure will be produced, while by increasing the width a fat or cartoon figure of much wider proportions will result.

The diagonals in Fig. 2 above $H^4$ form groups of three and four regular diamonds or rhombs of equal size forming the trunk.

Fig. 3 shows the addition of the shoulder lines $SH^1$ and $SH^2$ and the uprights $UP^1$ and $UP^2$. Also the beginnings of the lower half of the body, and Fig. 4 shows the body practically completed, with head diagonals, and arm and foot construction outlined. Fig. 5 shows the relation of the system of rhombs to the actual body lines, and Fig. 6 shows the agreement between the skeleton and body lines to the points as determined by the system.

Fig. 7 shows the natural following of the clothing lines to the body and diagonals of the system, and Fig. 8 shows how the folds or wrinkles in the drapery break or form naturally on the lines produced by the system.

The student may begin work upon sheets faintly ruled to show the arrangement of horizontal, vertical, and diagonal lines until familiar with their use and purpose, and then form his own similar lines, with gradually decreasing completeness as he improves in proficiency, until he finally may merely locate them with the eye and draw upon the imaginary framework thus presented to his mind. This system of teaching aids in rapidly increasing such proficiency and enabling the student to draw such figures boldly and freely with confidence in his accuracy or proportion, either in serious effort at artistic productions or in exaggerated forms for cartoon and comic illustration.

I claim:—

1. Means for teaching figure drawing, consisting of a surface bearing a plurality of diagonal intersecting lines dividing such surface into a plurality of regularly arranged rhombs juxtaposed to indicate the salient points of the figure.

2. Means for teaching figure drawing, consisting of a surface bearing a plurality of diagonal intersecting lines dividing such surface into a plurality of rhombs, a vertical line passing through the acute angles of a vertical row of such rhombs, and horizontal lines crossing said vertical line at the acute angles of the rhombs in adjacent vertical rows.

3. Means for teaching figure drawing, consisting of a series of equally spaced horizontal lines, each separated from the next by a space determined by the measurements of the head of the figure to be drawn, a vertical line intersecting said horizontal lines, and diagonal lines crossing each other at the intersection of said vertical and horizontal lines and forming a plurality of regular uniform rhombs.

4. Means for teaching figure drawing, consisting of a series of equally spaced horizontal lines, each separated from the next by a space equal to the length of the head of the figure to be drawn, a vertical line intersecting said horizontal lines and serving as the center line of such figure, points on such horizontal lines located at equally spaced intervals from said center line at distances equal to the length of such head, and a plurality of oppositely inclined diagonal lines intersecting said vertical line at each alternate crossing by said horizontal lines and passing through such points to form a plurality of rhombs, the latter with said vertical and horizontal lines serving to locate correctly certain prominent features of such figure and as a guide in completing such figure.

5. Means, in the nature of a chart, for teaching drawing, said chart having thereon an outline formed of juxtaposed rhombs and substantially straight lines in definitely fixed relation to said rhombs, representing salient points in the contour of the human figure.

6. Means, in the nature of a chart, for teaching drawing, said chart having thereon an outline formed of juxtaposed rhombs and substantially straight lines in definitely fixed relation to said rhombs, representing salient points in the contour of the human figure and lines intersecting angles of the rhombs.

In testimony that I claim the invention above set forth I affix my signature.

JACK SMITH.